United States Patent [19]

Phillips

[11] Patent Number: 4,654,946
[45] Date of Patent: Apr. 7, 1987

[54] METHOD OF CONVERTING A SEDAN TO A LIMOUSINE

[75] Inventor: Charles W. Phillips, Boca Raton, Fla.

[73] Assignee: Phillips Motor Car Corporation, Margate, Fla.

[21] Appl. No.: 865,104

[22] Filed: May 20, 1986

Related U.S. Application Data

[63] Continuation of Ser. No. 441,321, Nov. 12, 1982, Pat. No. 4,589,181.

[51] Int. Cl.⁴ .............................................. B60P 3/26
[52] U.S. Cl. .................................... 29/401.1; 29/428; 29/429
[58] Field of Search ............. 29/401.1, 402.02, 402.06, 29/402.07, 402.09, 402.12, 402.13, 402.18, 416, 428, 469

[56] References Cited

U.S. PATENT DOCUMENTS

| | | | |
|---|---|---|---|
| 4,014,585 | 3/1977 | Earnhart | 296/16 |
| 4,231,144 | 11/1980 | Bernacchia, Jr. | 29/401.1 |
| 4,589,181 | 5/1986 | Phillips | 29/401.1 |

Primary Examiner—Mark Rosenbaum
Assistant Examiner—Timothy V. Eley
Attorney, Agent, or Firm—Remy J. VanOphem

[57] ABSTRACT

A conventional production two-door motor vehicle converted to a four-door limousine by severing the frame of the production motor vehicle near the center of the passenger compartment into a forward frame segment and rear frame segment. The longitudinal roof, floor, and rocker panel extension sections are welded between the frame segments to lengthen the wheel base and the passenger compartment. Pillars are welded between the roof and the floor of the forward frame on either side of the forward frame segment. Front doors are attached to either side of the frame forward of the pillar and rear doors are attached to either side of the frame rearward of the pillar. In the preferred embodiment, the forward doors of the limousine are forward doors manufactured for the four-door version of the production motor vehicle. The doors removed from the two-door motor vehicle are modified and are used as the rear doors for the limousine.

20 Claims, 13 Drawing Figures

METHOD OF CONVERTING A SEDAN TO A LIMOUSINE

This is a continuation of application Ser. No. 441,321, filed on Nov. 12, 1982 now U.S. Pat. No. 4,589,181 issued on May 20, 1986.

FIELD OF THE INVENTION

The present invention relates to self-propelled motor vehicles and, more particularly, to a method for converting a two-door sedan to a limousine for passenger transportation.

BACKGROUND OF THE INVENTION

Because of the need to reduce unit cost, the automobile industry has been reluctant to proliferate the number of different sized vehicle frames in their line-up. The vehicle frames that they are currently offering and expect to offer in the future are smaller than those that were offered in previous years. Therefore, very few automotive companies offer limousines or large size sedans or wagons which may be readily converted into limousines. Thus, the consumers who seek limousines, such as funeral homes and limousine services, have to accept smaller and less comfortable vehicles than they would prefer or modify existing vehicles at considerable expense.

Usually, when a sedan or station wagon is to be converted into a limousine, the vehicle chosen to be converted is a four-door sedan. An example of a method for converting a four-door sedan into a limousine is shown in U.S. Pat. No. 1,310,425 (issued July 22, 1919). The disadvantage of converting a four-door sedan into a limousine is that location of the rear door, and the appearance of the roof of the vehicle is dissimilar to the classic limousine appearance.

What is needed, therefore, is an inexpensive method for converting a production motor vehicle to a limousine having a classic limousine appearance.

SUMMARY OF THE PRESENT INVENTION

The present invention provides a method for converting a two-door sedan motor vehicle into a four-door limousine.

The method of the present invention includes the step of removing the doors from a two-door motor vehicle. Next, the body of the vehicle is severed transversely at the passenger compartment through the openings for the doors and the severed front and rear segments of the body of the vehicle are longitudinally separated. A pillar is located vertically between the roof and the floor of the front body segment on each side of the vehicle a predetermined distance forward of the location where the vehicle was severed. Each of the pillars is joined at each of its ends to the portion of the roof or the floor adjacent to the respective end of the pillar. Longitudinal body segments are inserted between the separated sections of the roof and the floor of the body and are joined at each end to the adjoining sections of the body. Next, a new front door is installed on the hinges of the front body segment. Finally, the front doors originally removed from the two-door sedan are modified and each is fastened by hinges to one of the pillars to provide a rear door for the limousine.

In the preferred embodiment, the present invention is used to produce a four-door limousine version of a motor vehicle available in a two-door sedan and a four-door sedan or wagon version. The two-door motor vehicle is modified as described above. The pillar used in the above method is the same pillar used in the four-door production vehicle. The front doors installed on the hinges of the front body segment after modification of the two-door motor vehicle is the front door designed for the four-door production motor vehicle.

A principal object of this invention is to provide a method of converting a conventional two-door motor vehicle to a limousine.

Another object of this invention is to provide a method of producing a limousine from a conventional motor vehicle wherein the limousine has a classic limousine appearance and configuration.

A still further object of this invention is to provide a method of converting a conventional production motor vehicle to a customized vehicle with a lengthened wheel base to provide greater road stability for the vehicle and comfort for the occupants.

Further features, objects and advantages of the present invention will become apparent to those skilled in the art when the following detailed description of the preferred embodiment is read in conjunction with the drawings attached hereto.

BRIEF DESCRIPTION OF THE PREFERRED EMBODIMENT

Figure 1:
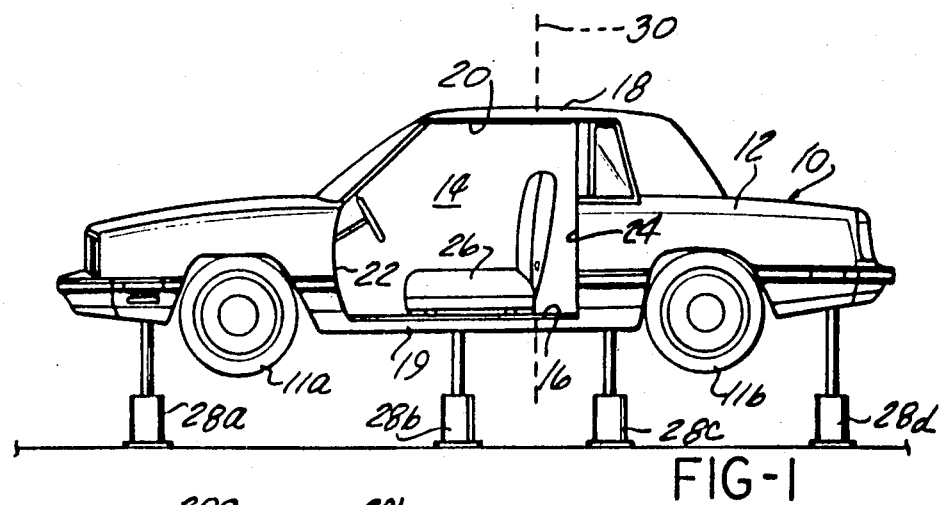
FIG. 1 is a side elevational view of a two-door motor vehicle, with the doors removed, which may be converted to a four-door limousine according to the method of the present invention, the body of the motor vehicle being supported by jacks.

Referring now to the drawing, and more particularly to FIG. 1 thereof, a two-door motor vehicle to be modified according to the method of the present invention is generally designated by the numeral 10. In the example illustrated, the motor vehicle 10 is a two-door sedan manufactured by Chrysler Corporation of Highland Park, Mich. under the general designation of "K-Car"

and marketed through its various dealerships as "Aries", "Reliant", "LaBaron", and "Dodge 400".

While the following description relates to the modification of the "K-Car" to a limousine, it will be apparent to one skilled in the art that the method of the present invention may be used to modify other production motor vehicles. In the preferred embodiment the motor vehicle to be modified is a two-door sedan which is capable, before modification, of transporting four to six passengers. Furthermore, in the preferred embodiment, the motor vehicle to be modified is a front wheel drive motor vehicle so that the number of components which must be modified or replaced will be minimized. Finally, in the preferred embodiment, the motor vehicle to be modified is one which is also manufactured in a four-door version so as to minimize the number of components for the four-door limousine which must be specially manufactured. Nonetheless, the method of the present invention may be used to modify rear wheel drive or four wheel drive vehicles and other types of production vehicles.

It will further be appreciated by those skilled in the art that the method of the present invention may be used to modify conventional motor vehicles to produce types of stretched motor vehicles having elongated passenger compartments and elongated wheel bases other than four-door limousines, such as funeral hearses. It is to be understood, therefore, that the invention is not limited in its application to the details of the particular arrangement shown and described, since the invention is capable of other embodiments.

FIG. 1 shows the frame and body of a 1982 "Chrysler LaBaron" motor vehicle 10 which is to be converted into a limousine having a lengthened passenger compartment and wheel base according to the method of the present invention. The vehicle has front wheels 11a, rear wheels 11b and a body 12 having a passenger compartment 14, a floor 16, a roof 18 and a rocker panel 19. The motor vehicle 10 originally has two doors which, as illustrated, have been removed from their respective doorways 20. Only one of the doorways 20 are shown in the drawing. Each of the doorways 20 is provided with a hinge mechanism at the forward edge 22 of the doorway and a latch mechanism at the rearward edge 24 of the doorway. Neither the hinge mechanism nor the latch mechanism are illustrated in the drawing since each is well known in the art and is an existing part of the motor vehicle 10 being modified.

To practice the method of the present invention, it may be necessary to remove the front seats 26 of the motor vehicle prior to the conversion, as now to be described. The motor vehicle 10 is supported by eight posts or jacks 28a through 28d only four of which are illustrated, disposed at appropriate intervals along its length on either side of the wheels 11a and 11b.

Appropriate interior trim, such as carpeting and roof inserts, are removed. Components extending from the front of the vehicle to the rear of the vehicle are disconnected and either completely removed or temporarily secured in place as is well known in the art. These components include brake lines, electrical wires, fuel lines, the exhaust system, a drip rail and the emergency brake cable. When the method of the present invention is used to modify a rear wheel or a four wheel drive vehicle, additional components extending along the length of the vehicle will be disconnected and/or removed, such as the drive shaft. Methods used for adjusting the length of each of these components so that they will function when the vehicle is elongated are well known in the art and, therefore, are not described herein or shown in the drawings.

According to the method of the present invention, the body 12 is transversely severed along a vertical plane 30 shown in FIG. 1, through the passenger compartment 14. The vertical plane 30 is selected, for reasons that will be apparent shortly, to be closer to the rearward edge 24 of the doorway 20 than to the forward edge 22 of the doorway 20.

Figure 2:
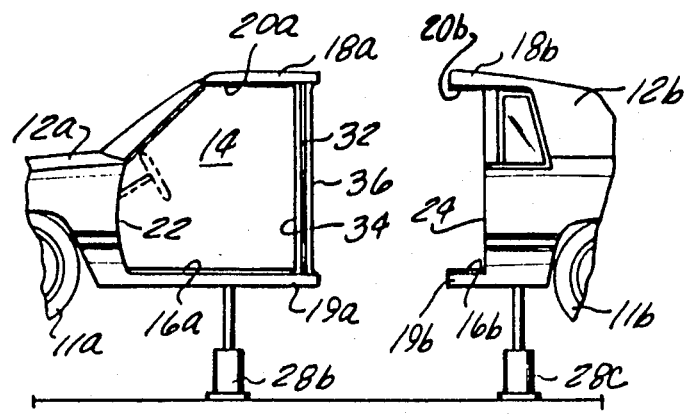
FIG. 2 is a partial side view similar to FIG. 1 and shows a portion of the motor vehicle thereof after the frame of the motor vehicle has been severed transversely into two frame segments, the frame segments have been separated a predetermined distance longitudinally and support pillars have been welded thereto.
Figure 3:
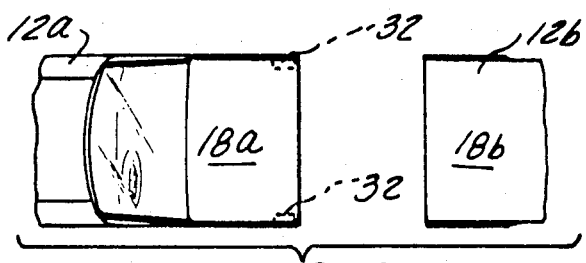
FIG. 3 is a partial top view of the motor vehicle of FIG. 2.

After the frame has been severed along the vertical plane 30, the severed frame segments 12a and 12b are separated longitudinally as shown in FIGS. 2 and 3. The front frame segment 12a is supported by the front wheels 11a and by the jacks 28a and 28b. The rear frame segment 12b is supported by the rear wheels 11b and by the jacks 28c and 28d.

A pillar 32, shown in FIG. 2, is inserted between the front roof segment 18a and the front floor segment 16a of the front frame segment 12a on either side of the motor vehicle 10. The pillar 32 is welded at either of its ends to the front frame segment 12a. Each of the pillars 32 divides one of the doorways 20 into a front doorway 20a and a rear doorway 20b for the motor vehicle 10. The pillar 32 is preferably a conventional pillar as currently manufactured to be used in the production or repair of the four-door version of the vehicle being modified which, in the illustrated embodiment is the "Chrysler LaBaron" motor vehicle. The location of the plane 30 and the location of the pillar 32 are preferably selected so that the front doorway 20a will be the same size as the front doorway of the conventional four-door version of the motor vehicle 10. The pillar 32 is provided with a latching mechanism, not shown in the drawing but well known in the art, on its forward edge 34 for selectively latching a front door, described later, within the front doorway 20a. The pillar 32 is further provided with a hinge mechanism, not shown but also well known in the art, on the rearward edge 36 of the pillar. This hinge mechanism is used for mounting a rear door, as described later, in the rear doorway 20b.

Next, several intermediary body sections are inserted between the front frame segment 12a and the rear frame segment 12b so as to reunite the severed frame segments 12a and 12b into an elongated frame 12. In the preferred embodiment, each of these intermediate body sections are approximately 30 to 33 inches in length. A jig may be used, if necessary, to align the frame segments 12a and 12b with each other and with the intermediate body sections. A floor section 38, shown in FIG. 4 is inserted between the floor segment 16a of the front frame 12a and the floor segment 16b of the rear frame segment 12b.

Figure 4:
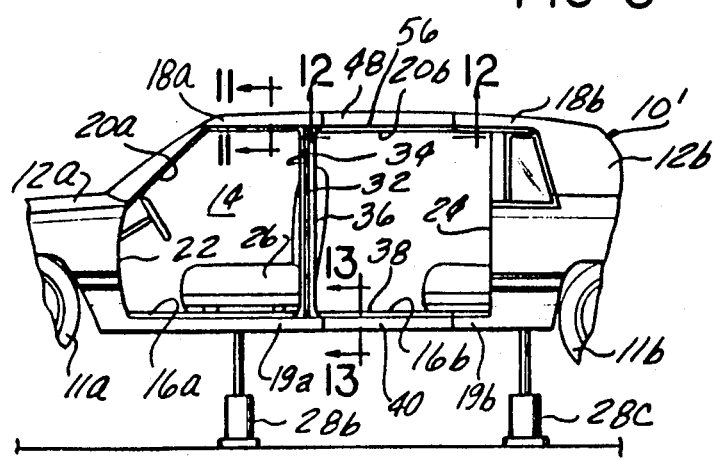
FIG. 4 is a partial side view similar to FIG. 2 and illustrates the motor vehicle thereof after a roof frame segment, a floor frame segment, and two rocker panel frame segments have been welded thereto.
Figure 5:
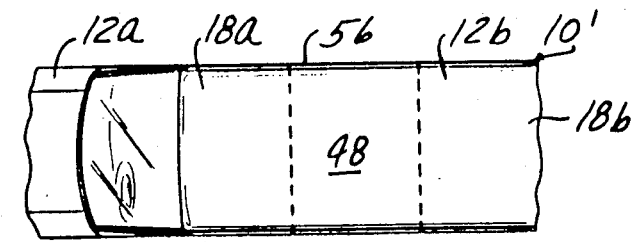
FIG. 5 is a partial top view of the motor vehicle of FIG. 4.
Figure 13:
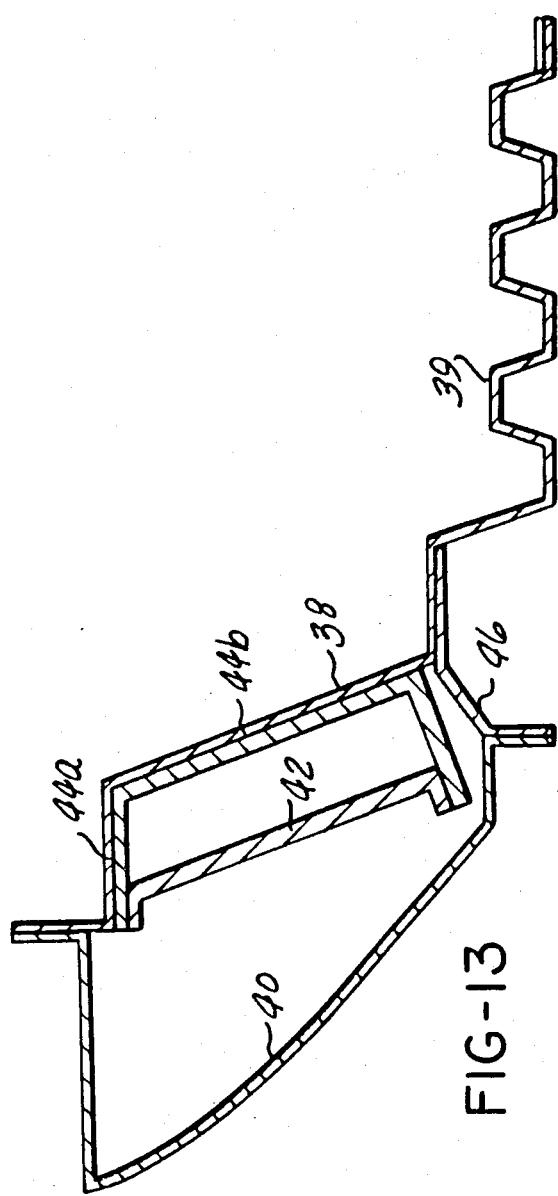

The structure of the floor section 38 is best illustrated in FIG. 13, and is also shown in FIG. 4. The floor section is generally contoured so as to continue the shape of the floor segments 16a and 16b and is welded at each of its edges adjacent, respectively, to the floor segments 16a and 16b with a small amount of overlap to form a single strong elongated floor 16'. The floor section 38 is provided with a series of strengthening ribs 39 extending longitudinally of the motor vehicle 10. In the preferred embodiment, there are three strengthening ribs 39 at each side of the floor section 38. With reference to FIG. 4, a rocker panel section 40 is inserted between the front rocker panel segment 19a of the front frame segment 12a and the rear rocker panel segment 19b of the rear frame segment 12b on each side of the motor vehicle 10. Each of the rocker panel sections 40 is buttjointed and welded to the adjacent rocker panel segments 19a and 19b to form a single elongated rocker panel 19' on each side of the motor vehicle. An inner support beam 42 shown in FIG. 13, may be provided at each side of the vehicle for added strength. The inner support beam 42 is longer than the rocker panel section 40, and may be as long, in the preferred embodiment, as 75 inches. The beam preferably is attached to the motor vehicle prior to the floor section 38 and the rocker panel section 40 and is welded as shown at 44a and 44b.

A flange section 46, shown only in FIG. 13, is also provided for insertion between flange segments, not shown in the drawing but part of the motor vehicle 10 being modified.

Figure 12:
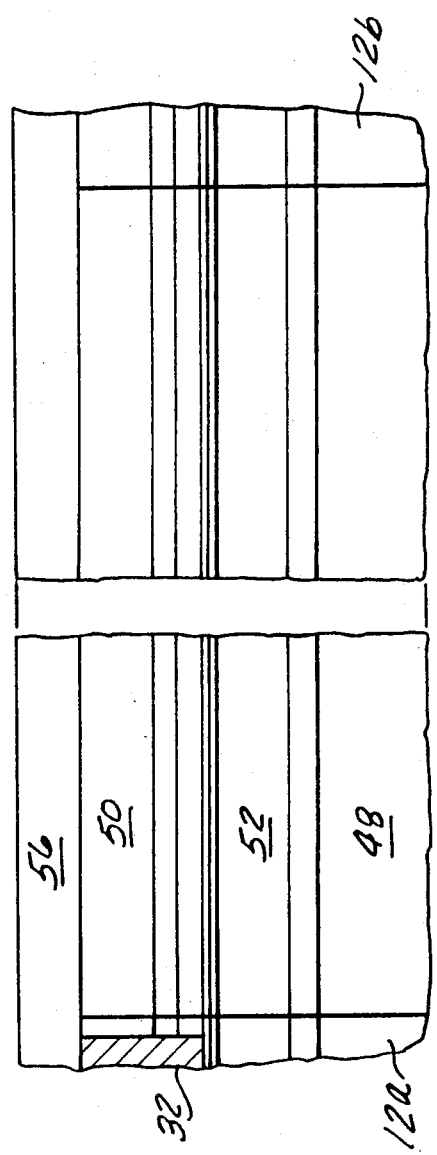
FIGS. 11, 12 and 13 are partial sectional views taken along lines 11—11 12—12, and 13—13, respectively, of FIG. 4.
Figure 11:
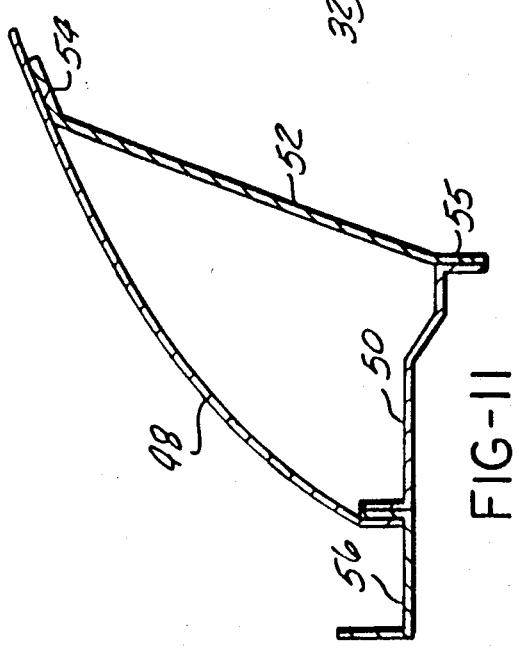

A roof section 48 is inserted between the front roof segment 18a of the front frame segment 12a and the rear roof segment 18b of the rear frame segment 12b and is welded with a predetermined amount of overlap at each of its ends to the adjacent roof segments so as to form a single elongated roof. A door jam section 50 and an inner roof support section 52 illustrated in FIGS. 11 and 12, are provided between, respectively, front and rear door jam segments and front and rear inner roof support segments, not illustrated, but part of the vehicle 10 being modified, and are each welded to the adjacent respective segments so as to form a single elongated door jam and inner roof support. As shown in FIG. 11, the inner roof support section 52 is welded at 54 to the lower side of the roof panel and at 55 to the door jam section. A single elongated drip rail 56 is provided on each side of the elongated motor vehicle 10' and is welded, not shown, to the roof 18' and the door jam 50.

The front seats 26 may be reinstalled in the motor vehicle 10. Interior trim, such as a cloth interior roof lining and a rear floor carpet may also be installed, as is well known in the art. Electrical wires extending between the front frame segment 12a and the rear frame segment 12b which were disconnected before the motor vehicle frame was severed, are replaced by longer electrical wires or are reconnected by use of extension wires in a manner well known in the art. Similarly, brake lines and fuel lines are reconnected by use of extension lines or are replaced by longer lines. In the preferred embodiment, a new emergency brake cable is installed. Finally, the exhaust system is reinstalled with a lengthened exhaust pipe.

Other suitable modifications may be made to the interior or exterior trim and equipment of the motor vehicle at this time. For example, a partition or extra seats may be installed in the passenger compartment.

Figure 6:
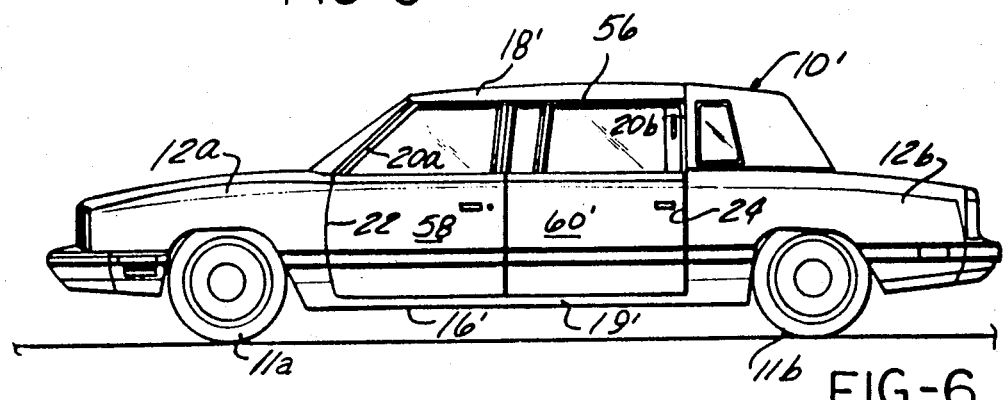
FIG. 6 is a partial view similar to FIG. 4 showing the motor vehicle thereof after the front and rear doors have been installed and the jacks have been removed.
Figure 7:
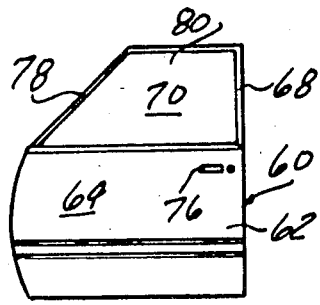
FIGS. 7 and 8 are, respectively, an exterior side view and a partly cut-away interior side view of the doors removed from the motor vehicle of FIG. 1 prior to modification of the door.
Figure 8:
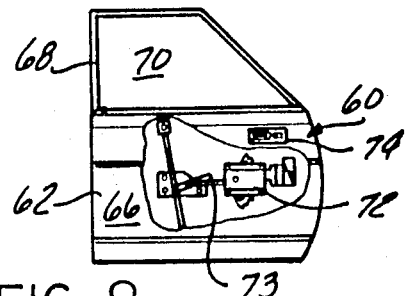
Figure 9:
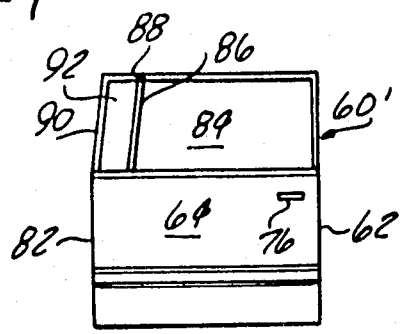
FIGS. 9 and 10 are side views similar to FIGS. 7 and 8, respectively, after the door has been modified for use as a rear door of the finished vehicle of FIG. 6.

Referring now to FIG. 6, a conventional front door 58 designed for the conventional four-door "Chrysler LaBaron" motor vehicle is installed in each of the front doorways 20a. As mentioned previously, the front doorway 20a is already provided with hinges and latches for the door 58.

Referring now to FIGS. 7 through 10, the doors 60 originally removed from the motor vehicle 10 may be modified for use as rear doors 60' on the elongated motor vehicle 10'. As shown in FIGS. 7 through 10, for one of the doors 60, each door has a main body 62 with an outer panel 64, an interior panel 66 and end plates, not shown, at each end. Each door 60 has a window frame 68, a window 70 conventionally mounted to the main body 62, a window mechanism 72 and linkage 73, for selectively retracting the window into the main body 62 between the panels 64 and 66. Each door is also provided with a door latch mechanism, not shown but well known, operable from either of an interior door latch control 74 and an exterior door latch control 76.

Figure 10:
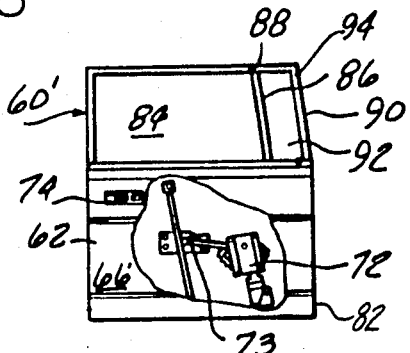

The door 60 is modified by cutting and removing a forward portion of the main body 62, the window frame 68, and the interior panel 66, and by temporarily removing appropriate interior components to avoid damage. As shown in the drawing, the main body is cut along a front edge or vertical line 82. The line 82 is spaced a predetermined distance from the rear of the door which will provide a modified rear door 60' suitable for the size of the doorway 20b in which the modified door will be installed. The window frame 68 may be cut along a vertical line 90 between the line 78 and the rear edge of the door. A conventional door hinge plate which is manufactured for installation on the rear doors of the four-door production version of the motor vehicle 10 is fastened to the front edge of the main body 62 of the modified rear door 60'. Once the modified rear door 60' has been cut and the hinge plate installed, it may be reassembled. It should be noted that the window mechanism 72 is modified by being remounted at an angle as illustrated in FIG. 10. The linkage 73 need not be altered, however. A first window 84 is installed in the main body 62 of the modified rear door 60'. The window 84 has a width a predetermined amount less than the width of the modified main body 62. The window 84 is interconnected with the window mechanism 72 and linkage 73 so that the window 84 may be selectively raised or lowered in a conventional manner. A window divider 86 is fitted vertically between the forward edge 88 of the cut window frame 68 and the upper portion of the main body 62. The divider 86 and the remaining portion of the cut window frame 68 together define a new window frame for the window 84. An additional L-shaped window frame member 94 is joined at one end to the forward edge 88 of the window frame 68 and is fastened at its other end to the upper end of the door main body. The frame member 94 together with the window divider 86 secure a small stationary parallelogram shaped window 92 and to the modified rear door 60'.

As shown in FIG. 10, in the preferred embodiment, the new interior panel 66' is provided for the modified rear door 60'. Also in the preferred embodiment, the interior door latch control has been moved rearwardly in a manner well known in the art. The movement of the interior door latch control is preferred since the control will be more accessible to the rear seat passenger of the motor vehicle 10' in this location.

As mentioned earlier and shown in FIG. 4, a rear doorway 20b has been formed on either side of the elongated motor vehicle 10' behind the pillars 32 and between the roof section 48 and the floor section 38. Each doorway 20b is already provided with a conventional hinge rearward edge 36 of the pillar 32 and a conventional door latch mechanism at their rearward edge 24 of the doorway. Thus, the modified rear doors 60' may be easily installed in the doorways 20b.

It is readily apparent that the above described invention provides a comparatively inexpensive means for converting a two-door sedan into an elongated four-door limousine. The method of the present invention requires a minimum of special components for the conversion. Furthermore, the method of the present invention results in a limousine which resembles the classic limousine in scale and in the location of the doors.

The above described constitutes a detailed description of the best mode contemplated by the inventor at the time of filing the present application wherein limiting terminology has been used for the purpose of description and not for the purpose of limiting the scope of the present invention. Many variations and modifications from the above description will be apparent to those skilled in the art and are included within the scope of the appended claims.

What is claimed as novel is as follows:

1. A method for converting a frame designed for a two-door production motor vehicle adapted for the attachment of two oppositely disposed side doors opening from a payload compartment to a lengthened frame for a lengthened motor vehicle adapted for the attachment of four side doors and having a lengthened payload compartment and a lengthened wheel base, said method comprising the steps of:

severing said frame transversely at said payload compartment and longitudinally separating said severed rearward frame segment and forward frame segment of the frame thereat;

inserting a longitudinal roof frame section and a longitudinal floor frame section between the separated rearward and forward segements of the frame at the payload compartment;

joining each of said inserted longitudinal frame sections at each of its edges adjoining sections of said rearward and forward frame segments to said frame sections; and inserting a vertical pillar between said roof and said floor on each side of the frame and joining said pillars at each end to said frame.

2. The method of claim 1 wherein forward doors for a four-door production motor vehicle and rearward doors for a four-door production motor vehicle similar to said two-door production motor vehicle are utilized, said method further comprising the steps of attaching said two forward doors to said frame ahead of each of said pillars and attaching said two rearward doors to each of said pillars.

3. A method of converting a two-door production motor vehicle having two oppositely disposed side doors to a lengthened motor vehicle having a lengthened payload compartment and a lengthened wheel base, said method comprising the steps of:

removing said two doors from the frame of said production motor vehicle;

severing the frame transversely at the payload compartment and longitudinally separating the severed rearward frame segment and forward frame segment of the frame thereat;

inserting a longitudinal roof frame section and a longitudinal floor frame section between the separated segments of the frame at the payload compartment;

joining each of said inserted longitudinal frame sections at each of its edges adjoining sections of said frame segments;

inserting a vertical pillar between said roof and said floor on each side of the frame and joining said pillars at each end to said frame;

attaching two forward doors to said frame forward of said pillar, one each of said forward doors being attached to said frame on either side of said frame; and attaching one rearward door having an upper window frame portion to each of said pillars, one each of said rearward doors being on either side of said frame behind said pillar.

4. The method of claim 3 wherein forward doors for a four-door production motor vehicle similar to said two-door production motor vehicle comprise said two forward doors attached to said frame and further wherein rearward doors for a four-door production motor vehicle similar to said two-door production motor vehicle comprise said rearward doors attached to each of said pillars.

5. The method of claim 5 wherein forward doors for a four-door production motor vehicle similar to said two-door production motor vehicle comprise forward doors for said forward doorways; wherein rearward doors for a four-door production motor vehicle similar to said two-door production motor vehicle comprise rearward doors for said rearward doorways; and wherein further said forward doors hingedly attach to said forward doorways and said rearward doors hingedly attach to said pillar in each of said doorways.

6. The method of claim 3 wherein pillars for a four-door production motor vehicle similar to said two-door production motor vehicle comprises said pillar inserted between said lengthened roof and floor in each of said doorways.

7. The method of claim 3 further comprising after said step of inserting said floor frame segment, the step of attaching an inner support element to each of said floor portions of said separated floor segments.

8. A method for converting a frame comprising a roof, a floor, a passenger compartment therebetween, and two oppositely disposed doorways opening into said passenger compartment to a frame having a lengthened roof, a lengthened floor, a lengthened passenger compartment, at least four doorways opening into said passenger compartment and a lengthened wheel base, said method comprising the steps of:

separating said frame transversely of said passenger compartment across said doorways into a forward frame segment and a rearward frame segment;

inserting a roof frame segment between the roof portions of said separated forward and rearward frame segments and joining said roof segment to each of said roof portions of said separated forward and rearward frame segments;

inserting a floor frame segment between the floor portions of said separated forward and rearward frame segments and joining said floor frame segment to each of said floor portions of said separated forward and rearward frame segments to form a single lengthened floor; and inserting a pillar having two ends between said lengthened roof and said lengthened floor and each of said doorways and joining one of said ends to said floor and the other of said ends to said roof, each of said pillars separating one of said lengthened doorways into a forward doorway and a rearward doorway.

9. The frame produced by the method of claim 8.

10. The method of claim 8 wherein forward and rearward doors for a four-door production frame similar to said frame being modified are utilized and wherein said method further comprises the step of hingedly attaching said production forward and rearward doors to said forward and rearward doorways, respectively.

11. The method of claim 8 wherein pillars for a four-door production frame similar to said frame being modified are utilized for each of said pillars inserted between said roof and said floor.

12. The method of claim 8 wherein said frame includes a rocker panel, said method further comprising the step of inserting a rocker panel frame section on each side of said frame between the rocker panel portions of said forward and rearward frame segments and joining said rocker panel sections to each of said rocker panel portions of said forward and rearward frame segments to form a single lengthened rocker panel on each side of said frame.

13. The method of claim 12 further comprising after said step of inserting said floor frame segment, the step of attaching an inner support element longer than said rocker panel frame segment to each of said forward and rearward floor frame segments and said floor sections.

14. A method for converting a frame comprising a roof, a floor, a passenger compartment therebetween, and two oppositely disposed doorways opening into said passenger compartment to a frame having a lengthened roof, a lengthened floor, a lengthened passenger compartment, four doorways opening into said passenger compartment and a lengthened wheel base, said method comprising the steps of:
placing said frame on support means;
severing said frame transversely at said passenger compartment across said doorways into a forward frame segment and a rearward frame segment;
separating said forward frame segment from said rearward frame segment;
inserting a pillar having two ends between the roof portion of said forward frame segment and the floor portion of said forward frame segment on each side of said frame and joining each said pillar at each of its ends to the adjacent portions of said frame, so as to form a forward doorway on each side of said frame ahead of each of said pillars between said roof and said floor portions;
inserting a roof frame segments between the roof portions of said frame segments and joining said roof frame segment to each of said roof frame portions to form a single lengthened roof; and
inserting a floor frame segment between the floor portions of said frame segments and joining said floor frame segments to each of said floor portions to form a single lengthened floor and to form a rearward doorway on each side of said frame between said roof frame portions and said floor frame portions.

15. The method of claim 14 wherein forward and rearward doors for a four-door production frame similar to said frame being modified are utilized and wherein said method further comprises the step of hingedly attaching said production forward and rearward doors to said forward and rearward doorways.

16. The method of claim 14 wherein center pillars for a four-door production frame similar to said frame being modified are utilized for each of said pillars inserted between said lengthened roof and said lengthened floor.

17. The method of claim 14 wherein said frame includes a rocker panel, said method further comprising the step of inserting a rocker panel frame segment on each side of said frame between the rocker panel portions of said frame segments and joining said rocker panel frame segment to each of said rocker panel portions to form a single lengthened rocker panel on each side of said frame.

18. The method of claim 14 further comprising after said step of inserting said floor frame segment, the step of attaching an inner support element to each of said floor frame segments of said single lengthened floor.

19. The frame produced by the method of claim 14.

20. A method of converting a two-door production motor vehicle having a passenger compartment, a frame comprising a roof, and a floor, and two doors to a four-door limousine having a lengthened frame comprising a lengthened passenger compartment, a lengthened roof, a lengthened floor, and a lengthened wheel base, said method comprising the steps of:
removing said two doors from the doorways on either side of the frame of said motor vehicle;
severing said frame transversely at the passenger compartment across said doorways into a forward frame segment and a rearward frame segment;
separating said forward frame segment from said rearward frame segment so that said doorways are lengthened;
inserting a roof frame segment between the roof portions of said separated frame segments and joining said roof segment to each of said roof portions of said separated frame segments to form a single lengthened roof;
inserting a floor frame segment between the floor portions of said separated frame segments and joining said floor frame segment to each of said floor portions of said separated frame segments to form a single lengthened floor;
inserting a pillar having two ends between said single lengthened roof and said single lengthened floor in each of said doorways and joining one of said ends to said single lengthened floor and the other of said ends to said single lengthened roof, said pillar in each of said doorways separating each one of said doorways into forward doorways and rearward doorways;
hingedly attaching forward doors to each side of said lengthened frme to selectively close said forward doorways; and
hingedly attaching rearward doors having an upper window frame portion to each side of said lengthened frame to selectively close said rearward doorways.

* * * * *

UNITED STATES PATENT AND TRADEMARK OFFICE
CERTIFICATE OF CORRECTION

PATENT NO. : 4,654,946

DATED : Apr. 7, 1987

INVENTOR(S) : Charles W. Phillips

Page 1 of 2

It is certified that error appears in the above-identified patent and that said Letters Patent is hereby corrected as shown below:

Column 1, line 40, delete "SUM-".

Column 1, line 41, delete "MARY" and insert ---- SUMMARY ----, same line, make "SUMMARY OF THE PRESENT INVENTION" a subtitle.

Column 3, line 53, after "28d" insert a comma ---- , ----.

Column 4, line 38, after "shown" insert a comma ---- , ----.

Column 4, line 51, after "frame" insert ---- segment ----.

Column 5, line 5, after "42" insert a comma ---- , ----, same line, delete "at" and insert ---- on ----.

Column 5, line 22, after "52" insert a comma ---- , ----.

Column 7, line 1, delete "described" and insert ---- description ----.

UNITED STATES PATENT AND TRADEMARK OFFICE
CERTIFICATE OF CORRECTION

PATENT NO. : 4,654,946　　　　　　　　　　　　　Page 2 of 2

DATED : Apr. 7, 1987

INVENTOR(S) : Charles W. Phillips

It is certified that error appears in the above-identified patent and that said Letters Patent is hereby corrected as shown below:

Column 8, line 11, delete "5" second occurance and insert ---- 3 ----.

Column 10, line 52, indent line 10 spaces, same line, delete "frme" and insert ---- frame ----.

Column 10, line 53, indent line 10 spaces.

Signed and Sealed this

Twenty-ninth Day of September, 1987

Attest:

DONALD J. QUIGG

Attesting Officer　　　　Commissioner of Patents and Trademarks